United States Patent [19]

Zellar et al.

[11] 4,095,010

[45] June 13, 1978

[54] GLASS FIBER WOOL BINDER

[75] Inventors: Wade V. Zellar; Carl R. Strauss, Newark, Ohio

[73] Assignee: Owens-Corning Fiberglas Corporation, Toledo, Ohio

[21] Appl. No.: 767,089

[22] Filed: Feb. 9, 1977

[51] Int. Cl.$^2$ .............. B32B 17/02; C03C 25/02; C08L 61/06; C08L 89/04
[52] U.S. Cl. .................... 428/375; 65/3 C; 260/7; 428/378; 428/392
[58] Field of Search ............ 260/7; 427/339, 407; 65/3 C; 428/378, 379, 392, 375

[56] References Cited

U.S. PATENT DOCUMENTS

| | | | |
|---|---|---|---|
| 2,467,498 | 4/1949 | Redfern | 260/7 |
| 2,580,890 | 1/1952 | Clark | 260/7 |
| 2,702,754 | 2/1955 | Rao et al. | 260/7 |
| 3,288,734 | 11/1966 | Stalego | 260/7 |
| 3,471,420 | 10/1969 | Campbell | 260/7 |
| 3,956,204 | 5/1976 | Higginbottom | 260/7 |

*Primary Examiner*—J.C. Cannon
*Attorney, Agent, or Firm*—Ronald C. Hudgens; Philip R. Cloutier; Dennis M. Kozak

[57] ABSTRACT

A glass fiber wool binder composition comprising a phenolic resole resin, animal bone glue, a sulfite process lignin and dicyandiamide is disclosed. When a binder composition of this invention is employed on glass fibers to produce uncured glass fiber wool, the uncured wool exhibits improved integrity, thus facilitating alignment of uncured wool in mold contours and the production of molded products.

12 Claims, No Drawings

GLASS FIBER WOOL BINDER

This invention relates to glass fiber wool. In one of its more specific aspects, this invention relates to a binder composition for glass fiber wool.

The production of glass fiber wool is well known in the insulation art. Generally, glass wool is produced by supplying molten glass to a spinner, spinning the spinner to cause the molten glass to pass through holes in walls of the spinner, collecting the resulting glass fibers on a conveyor, applying a binder composition to the glass fibers to produce uncured glass wool, curing the binder to produce glass wool insulation or pleating the uncured glass wool to facilitate mold alignment and the production of various molded products such as molded pipe insulation.

One problem encountered in the production of glass wool, which is employed to produce molded products, is that between the application and the cure of the binder, the uncured wool absorbs moisture from the air. Absorption of moisture from the air causes the uncured wool to become limp and lose its integrity and, accordingly, the uncured wool will not pleat properly to facilitate alignment in mold contours.

The present invention provides a binder composition which, when applied to glass fibers, serves to increase wool stiffness and, accordingly, improves glass wool stability for pleating and molding.

According to this invention, there is provided at least one glass fiber at least a portion of the surface of which is in contact with a residue produced by removing water from an aqueous composition comprising: (1) a phenolic resole resin, (2) animal bone glue, (3) a sulfite process lignin, and (4) dicyandiamide.

Also, according to this invention, there is provided an aqueous binder composition comprising: (1) a phenolic resole resin, (2) animal bone glue, (3) a sulfite process lignin, and (4) dicyandiamide.

The binder compositions of this invention can also comprise coupling agents, dispersants, cure accelerators, oil-in-water emulsions, emulsion stabilizers, neutralizing agents, free formaldehyde scavengers, and the like.

In a preferred embodiment, the binder composition of this invention will also comprise: (5) a nitrogen-containing, free-formaldehyde scavenger, (6) a silane coupling agent, (7) a dispersant, (8) a cure accelerator, (9) an oil-in-water emulsion, (10) an emulsion stabilizer, and (11) at least one resin neutralizing agent.

The binder composition of this invention, will be comprised, preferably, of the following components:

(1) a phenolic resole resin in an amount within the range of from about 35 to about 60 parts by weight. As used herein, parts by weight will mean by weight of the aqueous binder composition;

Any suitable phenolic resole can be employed. A particularly suitable phenolic resole is that prepared in Example I.

(2) animal bone glue in an amount within the range of from about 5 to about 15 parts by weight;

(3) a sulfite process lignin in an amount within the range of from about 5 to about 20 parts by weight;

Any suitable sulfite process lignin can be employed. Particularly suitable are ammonium lignosulfonate, calcium lignosulfonate, magnesium lignosulfonate and combinations thereof.

(4) dicyandiamide in an amount within the range of from about 15 to about 30 parts by weight;

(5) a nitrogen-containing, free-formaldehyde scavenger in an amount within the range of from about 5 to about 15 parts by weight;

Particularly suitable nitrogen-containing, free-formaldehyde scavengers are urea, melamine and the like. The free-formaldehyde scavenger serves to prevent release of irritating formaldehyde fumes during processing.

(6) a silane coupling agent in an amount within the range of from about 0.005 to about 0.2 part by weight;

Any suitable silane coupling agent can be employed. A particularly suitable silane coupling agent is designated "A-1100" commercially available from Union Carbide. "A-1100" is gamma-aminopropyltriethoxysilane.

(7) a dispersant in an amount within the range of from about 0.3 to about 1 part by weight;

Any suitable dispersant can be employed. A particularly suitable dispersant is designated by the trademark "Calgon", commercially available from Calgon Corporation. "Calgon" is sodium hexametaphosphate.

(8) a cure accelerator in an amount within the range of from about 0.5 to about 2 parts by weight;

Suitable cure accelerators include boric acid, nitric acid, maleic anhydride and the like.

(9) an oil-in-water emulsion in an amount within the range of from about 3 to about 8 parts by weight;

Any oil-in-water emulsion comprising all in an amount of from about 40 to about 60 percent and water in an amount of from about 60 to about 40 percent can be employed.

(10) an emulsion stabilizer in an amount sufficient to increase the pH of the binder composition, in the absence of the animal bone glue and the oil-in-water emulsion to about 8.5;

(11) at least one neutralizing agent in a total amount within the range of from about 1.5 to about 6 parts by weight.

Suitable neutralizing agents include diammonium phosphate, monoammonium phosphate, ammonium nitrate, ammonium sulfate, ammonium chloride, and the like.

Demineralized water will comprise the balance of the binder composition such that the binder composition will comprise from 16% to about 24% solids.

The binder composition of this invention is prepared by conventional methods such as described below. It can be applied to any glass fibers conventionally employed to produce glass fiber wool, generally, being sprayed on the glass fibers at forming or as the fibers are collected on a conveyor.

Having described the basic ingredients of the invention, reference is now made to the following examples which are provided by way of illustration and not by way of limitation of the practices of the invention.

EXAMPLE I

This example demonstrates the preparation of a phenolic resole resin particularly suitable for use in a binder composition of the present invention.

About 6,250 gallons of formaldehyde (50%) were added to a reactor at a temperature of about 110° F.

About 2,890 gallons of phenol were added to the reactor with agitation and the resulting phenol-formaldehyde mixture was agitated for about 5 minutes.

About 785 gallons of water were added to the reactor and the resulting phenol-formaldehyde water mixture was agitated for about 5 minutes.

About 1,850 pounds of calcium hydroxide were added to the reactor contents over a period of about 3 hours at a temperature of about 110° F and then the temperature of the reactor was increased to 125° F for a period of about 1 hour.

The temperature of the reactor was increased to about 150° F and maintained for a period of about 2½ hours or until a free-formaldehyde content of about 9.5% was attained.

The contents of the reactor were permitted to cool to room temperature and a phenolic resole resin suitable for use in a binder composition of this invention was recovered.

EXAMPLE II

This example demonstrates the best mode for producing a binder composition of this invention.

About 23 parts by weight of dicyandiamide were added to the main mix tank with demineralized water at a temperature of about 140° F in an amount sufficient to dissolve the dicyandiamide. After the dicyandiamide was dissolved, a sufficient amount of demineralized water was added to the main mix tank to decrease the temperature of the contents to about 100° F.

About 9 parts by weight of urea and 47 parts by weight of the phenolic resole resin of Example I were added to the main mix tank and the resulting mixture was agitated for about 2 hours.

Next, about 0.1 part by weight silane coupling agent ("A-1100"), about 0.5 part by weight sodium hexametaphosphate ("Calgon"), about 1.5 parts by weight boric acid, about 3.0 parts by weight diammonium phosphate and about 0.5 part by weight ammonium sulfate were added to the main mix tank with agitation.

Agitation was continued and a sufficient amount of ammonia was added to increase the pH of the main mix tank contents to about 8.5.

About 6 parts by weight animal bone glue and about 50 parts by weight demineralized water were added to a premix vessel with agitation. Agitation was continued until the animal bone glue was dissolved and then the contents of the premix vessel were added to the main mix tank with agitation.

About 15 parts by weight of ammonium lignosulfonate were added to the main mix tank with agitation.

About 6 parts by weight of a 50/50 oil-in-water emulsion were added with agitation to the main mix tank.

A sufficient amount of demineralized water was added to the main mix tank to bring the resulting mixture to a solids level of about 20% and the mixture then recovered as a binder composition of this invention.

EXAMPLE III

For comparative purposes, a series of uncured glass fiber wool samples were prepared. Each sample (50 samples being prepared) was prepared using substantially the same procedure with the exception that the binder composition of this invention was applied to one-half of the samples and a prior art binder composition not comprising the combination of a phenolic resole resin, animal bone glue, a sulfite process lignin and dicyandiamide was applied to the remaining samples. All samples in the series were pleated and molding of each sample was attempted. The percentage of samples which were capable of being molded, that is, which maintained a sufficient stiffness to facilitate satisfactory alignment in mold contours, was as follows:

| | Uncured Glass Fiber Wool | |
|---|---|---|
| | Binder of Invention | Prior Art Binder |
| Percentage of sample capable of being molded | 84.0 | 68.6 |
| Percentage of sample not capable of being molded | 16.0 | 31.4 |

It will be seen from the above data that the binder composition of the present invention acts to increase the present molding efficiency of uncured glass fiber wool to a greater extent than does the prior art binder composition.

EXAMPLE IV

A second series of uncured glass fiber wool samples (10 inches × 4 inches) were prepared. Again, each sample (6 samples being prepared) was prepared using substantially the same procedure with the exception that the binder composition of this invention was applied to one-half of the samples and a prior art binder composition was applied to the remaining samples.

All samples were exposed to 100% relative humidity for a period of 18 hours. The integrity of each sample was measured by placing each sample on a horizontal surface such that 6 inches of each sample hung over the edge of the horizontal surface. The sag in each sample was measured, sag being in distance in inches from horizontal to the lowest point to which the sample extended, with the following results:

| | Uncured Glass Fiber Wool | |
|---|---|---|
| | Binder of Invention | Prior Art Binder |
| Sag (inches, average of samples) | 2.5 | 4.5 |

Since wool integrity is inversely proportional to the amount of sag, the above data show that the binder composition of the present invention acts to increase uncured glass fiber wool integrity to a greater extent than does the prior art binder composition.

It will be evident from the foregoing that various modifications can be made to the present invention. Such, however, are considered as being within the scope of the invention.

What is claimed is:

1. At least one glass fiber at least a portion of the surface of which is in contact with a residue produced by removing water from an aqueous composition comprising: (1) a phenolic resole resin, (2) animal bone glue, (3) a sulfite process lignin and (4) dicyandiamide.

2. The glass fiber of claim 1 in which said sulfite process lignin is selected from the group consisting of ammonium lignosulfonate, calcium lignosulfonate, or magnesium lignosulfonate.

3. The glass fiber of claim 1 in which said aqueous composition comprises in parts by weight said phenolic resole resin in an amount within the range of from about 35 to about 60 parts, said animal bone glue in an amount within the range of from about 5 to about 15 parts, said sulfite process lignin in an amount within the range of from about 5 to about 20 parts and said dicyandiamide in an amount within the range of from about 15 to about 30 parts.

4. The glass fiber of claim 1 in which said composition further comprises a silane coupling agent, a dispersant, a cure accelerator, and a nitrogen containing, free-formaldehyde scavenger.

5. The glass fiber of claim 4 in which said composition comprises in parts by weight said silane coupling agent in an amount within the range of from about 0.005 to about 0.2 part, said dispersant in an amount within the range of from about 0.3 to about 1 part, said cure accelerator in an amount within the range of from about 0.5 to about 2 parts, and said nitrogen-containing, free-formaldehyde scavenger in an amount within the range of from about 5 to about 15 parts.

6. The glass fiber of claim 4 in which said sulfite process lignin is ammonium lignosulfonate, said silane coupling agent is gamma-aminopropyl-triethoxysilane, said dispersant is sodium hexametaphosphate, said cure accelerator is boric acid and said nitrogen-containing, free-formaldehyde scavenger is selected from the group consisting of urea and melamine.

7. An aqueous composition comprising: (1) a phenolic resole resin, (2) animal bone glue, (3) a sulfite process lignin, and (4) dicyandiamide.

8. The aqueous composition of claim 7 in which said sulfite process lignin is selected from the group consisting of ammonium lignosulfonate, calcium lignosulfonate, or magnesium lignosulfonate.

9. The aqueous composition of claim 7 in which said aqueous composition comprises in parts by weight said phenolic resole resin in an amount within the range of from about 35 to about 60 parts, said animal bone glue in an amount within the range of from about 5 to about 15 parts, said sulfite process lignin in an amount within the range of from about 5 to about 20 parts and said dicyandiamide in an amount within the range of from about 15 to about 30 parts.

10. The aqueous composition of claim 7 in which said composition further comprises a silane coupling agent, a dispersant, a cure accelerator, and a nitrogen-containing, free-formaldehyde scavenger.

11. The aqueous composition of claim 10 in which said composition comprises in parts by weight said silane coupling agent in an amount within the range of from about 0.005 to about 0.2 part, said dispersant in an amount within the range of from about 0.3 to about 1 part, said cure accelerator in an amount within the range of from about 0.5 to about 2 parts, and said nitrogen-containing, free-formaldehyde scavenger in an amount within the range of from about 5 to about 15 parts.

12. The aqueous composition of claim 10 in which said sulfite process lignin is ammonium lignosulfonate, said silane coupling agent is gamma-aminopropyltriethoxysilane, said dispersant is sodium hexametaphosphate, said cure accelerator is boric acid and said nitrogen-containing, free-formaldehyde scavenger is selected from the group consisting of urea and melamine.

* * * * *